Patented Feb. 10, 1953

2,628,171

UNITED STATES PATENT OFFICE 2,628,171

SOLVENT-SOLUBLE WATER-REPELLENCY COMPOSITIONS

Larry Q. Green, New Castle County, Del., assignor to E. I. du Pont de Nemours & Company, Wilmington, Del., a corporation of Delaware No Drawing. Original application February 23, 1950, Serial No. 145,893. Divided and this application March 14, 1951, Serial No. 215,640

8 Claims. (Cl. 106—271)

This application is a division of my copending application Serial No. 145,893, filed February 23, 1950. The invention herein relates to a new composition of matter useful in treating fabrics, to render them water-repellent.

It is an object of this invention to provide a water-repellency composition adapted primarily for use in dry cleaning establishments, and especially suitable for the application to finished garments. Another object is to produce a water-repellency composition of the aforenoted type, but characterized by simplicity of application to the fabric, rendering for instance unnecessary the hitherto customary curing step. A further object is to produce a water-repellency composition employing a paraffin wax as the essential water-repellency factor but improving its uniform distribution and effectiveness when applied to the fabric. A still further object is to produce a storage-stable composition available for ready use by a dry cleaner and requiring merely thinning or dissolution in one of the customary dry-cleaning fluids, for instance Stoddard solvent, to be ready for use. Various other useful objects and effects of my invention will appear as the description proceeds.

Solvent soluble water-repellent compositions have been manufactured and used for many years. One of the earliest useful compositions was described in U. S. Patent 93,102 issued in 1869. This patent relates to the use of paraffin wax, a volatile solvent and an aluminum soap (stearate) as a water-repellent composition. In all the intervening years since this patent was issued, no basic or marked improvement has been made in the composition, except perhaps through the use of purer starting materials. The greatest demand for a product of this type is from dry cleaning establishments who desire a composition for use in imparting a water-repellent finish to raincoats and other garments after they have been dry cleaned. The most commonly used cleaning solvent is a petroleum fraction, boiling from 145°–200° C. and having a flash point of 100°–110° F., known as Stoddard solvent in the trade. A more precise definition of this solvent may be found in the literature. See for instance, "The Condensed Chemical Dictionary," 3d ed., page 604 or "Chemicals of Commerce" by Snell, page 185.

A useful water-repellent composition must have an appreciable solubility in this solvent. This solubility requirement has remained one of the most troublesome factors in the utilization of the aluminum stearate-wax mixture. Thus, one of the present day commercial products requires heating to 120° F. in order to make a 10% solution thereof in Stoddard solvent in a reasonable length of time. But inasmuch as the flash point of the solvent is only at about 100°–110° F., a dangerous fire hazard exists when using this product. Another serious drawback to the present day products containing aluminum soaps and wax is that they do not lead to a high degree of water-repellency, especially as compared with the recently developed so-called permanent water-repellents, for instance stearamido-methyl-pyridinium chloride (U. S. P. 2,146,392).

I have now found that an efficient water-repellent with excellent solubility and stability characteristics can be made, while still using a paraffin wax or some other convenient hydrocarbon wax as principal water-repellency factor, if an ortho ester of titanium of the general formula set forth hereinbelow is incorporated into the wax-solvent mixture. The resultant composition on application to fabrics from an organic solvent leads to a much greater repellency effect than a simple wax-solvent mixture or the mixtures comprising wax, solvent and aluminum soap. In addition, my new water-repellency composition dissolves readily in the customary dry cleaning solvents (hydrocarbon fractions or chlorinated hydrocarbons) at temperatures as low as 75°–80° F., which is by a wide, safe margin below the flash point of Stoddard solvent or similar hazardous hydrocarbon fractions.

Furthermore, I have found that the novel water-repellency compositions of this invention possess the remarkable advantage in that the fabrics treated therewith require no cure (i. e. heat treatment) to develop their maximum water-repellency. This is a most surprising property, inasmuch as most of the water-repellency compositions on the market today, whether of the wax-aluminum soap variety or of the permanent water-repellent type, require drying at temperatures of about 105° to 175° C. for periods of time varying from a few seconds to half an hour. Since curing facilities are generally not available in dry cleaning establishments where most of my novel products are intended for use, my invention thereby offers a distinct practical advantage.

Inasmuch as my novel composition is intended to be applied to fabric from the standard dry cleaning solvents, which are generally water-immiscible, non-polar solvents, it is necessary that the titanium compound selected for my invention shall be soluble in such solvents. A high order of solubility, however, is not required, inasmuch as my novel adjuvants are efficient even in very small quantities, say 0.15 part by weight for each 100 parts of wax employed. Considering further that in dry cleaning practice, the concentration of waxy material in the non-polar solvent is of the order of 5% by weight and seldom exceeds 10% by weight, it is clear that if the organic titanium compound is soluble to an extent of 0.01 part per 100 parts of non-polar solvent, it can be employed usefully in my invention.

Now according to this invention, compounds satisfying the above physical requirements and satisfying the objects of this invention to an excellent degree are the ortho esters of titanium of the general formula—

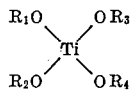

wherein some of the R's represent lower alkyl radicals (not over 6 C-atoms), while the remainder represent radicals of a 2-(lower alkyl)-1,3-alkane-diol whereof the alkane radical has a chain length not less than 4 but may have as high as 24 C-atoms or more, while the lower alkyl radical has not more than 4 C-atoms. In other words, the 2-(lower alkyl)-1,3-alkane-diols may be represented by the general formula—

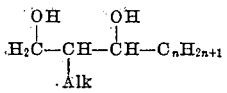

wherein Alk is an alkyl radical of not over 4 C-atoms, while $n$ may have a value from 1 to 21 or higher.

As typical illustrations of such suitable diols may be mentioned—

Tri(2-ethyl-3-hydroxy-hexyl)-monopropyl titanate,

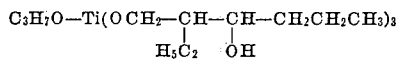

and

Monoisopropyl-tri(2-methyl-3-hydroxy-pentyl)-titanate,

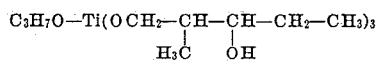

The aforementioned compounds may be prepared by heating a symmetrical, lower alkyl titanium tetraester with an optional proportion of the selected diol, whereby a mixed reaction product is obtained. Moreover, such mixed reaction products may be used directly in this invention, that is without regard to the degree of alkyl radical interchange which has taken place, and without separation of the reaction products into their constituents.

The configuration

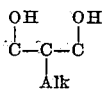

in the diol radical seems to play a very important role in the functioning of the entire titanium ester compound. Thus, if an alkane-diol which has no alkyl group in the 2-position is employed, for instance 1,3-butanol, polymerization takes place in the reaction, and the product is not sufficiently soluble in non-polar solvents to satisfy my specifications above.

Again, if a diol having the OH groups placed otherwise than in the 1,3-positions is employed, compounds of good solubility in Stoddard solvent may be obtained, and these often have an excellent effect on the water-repellency characteristics of a wax-solvent mixture, but they generally suffer from instability to moisture. Consequently, if the cleaner employs a commercial drycleaning fluid which contains a small amount of water, the added diol compound may precipitate out, producing a cloudy application bath and leading to an uneven distribution thereof on the fabric.

As illustrations of such operative, but water-sensitive titanium esters, may be mentioned those obtained by reacting, say, tetra-isopropyl titanate with one of the following diols:

2-methyl-2,4-pentanediol,
2,3-butanediol,
Pinacol:

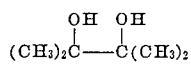

Dipropylene glycol:

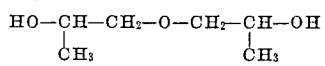

1,12-octadecanediol, and
9-chloro-1,12-octadecanediol

Where the alkane-diol has a long-chain radical, say 18 to 24 C-atoms, the ester itself may have to some extent water-repellency characteristics. There is, therefore, no upper limit to the quantity of titanium compound that may be incorporated in a given quantity of paraffin wax, inasmuch as the excess does no harm. But from the viewpoint of economics, a quantity of titanium compound corresponding to between 0.15% and 25% of the weight of paraffin wax employed constitutes the preferred range.

As for the waxy component, any wax customarily employed or suitable to be employed for imparting water-repellency to textile fibers may be employed in this invention. More specifically, I may use natural or synthetic paraffin waxes, low-molecular polyethylenes, petrolatum wax or in general any hydrocarbon wax melting within the range of 33° C. to 90° C. The optimum waxes, however, from the standpoint of efficiency and solubility are those melting at about 60° to 70° C.

For the purpose of facilitating the use of my novel composition by the practical man in the dry cleaning trade, I prefer to prepare the same for the market in the form of a paste or semifluid by adding thereto an optional quantity of an organic liquid selected from among those customarily employed as dry cleaning solvents, for instance Stoddard solvent, carbon tetrachloride, trichlorethylene and tetrachlorethylene or of some other convenient, non-polar solvent, for instance benzene or monochlorobenzene. A quantity of such liquid amounting to about 40% by weight of the entire marketable composition will generally produce a product of pasty consistency which dissolves readily when added to a further quantity of a dry-cleaner's fluid. But the practice may obviously be varied within wide limits.

I find that the novel compositions of my invention are applicable with success to almost any conceivable textile fiber. Among those actually tested by me are cotton gabardine, poplin, sateen, jean cloth, viscose rayon, wool crepe, nylon and polymeric acrylonitrile fiber. The coatings have been applied both by immersion and by spraying. Wax loadings of 25% or more (based on fabric) can be used, but 1 to 15% is a more practical range, and 3 to 6% is preferred.

As already noted, curing is superfluous when my novel composition is employed. Consequently, the next step after impregnation is simply "drying," that is evaporation of the solvent off the treated fabric.

Without limiting my invention, the following examples are given to illustrate my preferred mode of operation. Parts mentioned are by weight. The method employed in these examples for evaluating the water-repellency produced is that described in the Technical Manual and Yearbook of the American Association of Textile Chemists and Colorists, vol. XXIV, pp. 47–48, 1947–1948. In this method, the fabrics are subjected to a water spray under a standard set of conditions and the degree of wetting is estimated by comparing the partially wetted fabrics to a set of standards on a chart. The fabrics are then assigned ratings of 0, 50, 70, 80, 90, or 100 on the basis of the comparison to the standards.

Example 1

To 20 parts of Stoddard solvent is added 1.2 parts of 2-ethyl-1,3-hexanediol and 0.8 part of tetraisopropyl titanate. An immediate reaction occurs with the liberation of heat and the formation of a mixed titanate ester. 58 parts of molten paraffin wax (M. P. 65° C.) and 20 parts of Stoddard solvent are then added and the mixture is stirred until homogeneous. The colorless liquid sets up to a thin white paste on cooling. A spray test rating of 90 or better is obtained when this formulation is applied at 3% wax loading to jean cloth.

Example 2

A formulation is prepared exactly as in Example 1 except that 2-methyl-1,3-pentanediol is used in place of the 2-ethyl-1,3-hexanediol. A spray test of 90 or better is obtained at 3% wax loading on jean cloth.

Example 3

To 16 parts of tetraisopropyl titanate there is added rapidly 24 parts of 2-ethyl-1,3-hexanediol. An immediate exothermic reaction occurs to give a mixed titanate ester. 20 parts of melted paraffin wax (M. P. 65° C.) and 40 parts of Stoddard solvent are then added and the mixture stirred until homogeneous. On application to cotton gabardine at a loading of 3% active ingredient (ester + wax) a spray test of 90 is obtained.

Example 4

A mixed titanate ester is prepared by the rapid addition of 2.2 parts of 2-ethyl-1,3-hexanediol to 1 part of tetrabutyl titanate. A rapid exothermic reaction occurs with the formation of a mixed titanate ester. 0.5 part of this ester is added to 59.5 parts of molten paraffin wax (M. P. 65° C.). 40 parts of Stoddard solvent is then added and mixture stirred to give a homogeneous solution which on cooling to room temperature sets up to a white waxy paste. This formulation gives spray test of 90 or better on application to cotton sateen at a wax loading of 3%.

Example 5

A mixed titanate ester is prepared by the rapid addition of 1.5 parts of 2-ethyl-1,3-hexanediol to 1 part of tetraisopropyl titanate. 2 parts of this reaction product are added to 58 parts of a paraffin wax melting at 77° C. 40 parts of Stoddard solvent are then added and the mixture is stirred and heated until homogeneous. This product leads to a spray rating of 90 or better on application to spun rayon at 3% loading.

Example 6

A composition of matter is prepared as in Example 5, except that a paraffin wax melting at 88° C. is used. This formulation leads to spray test rating of 80 or better on application to spun alone at 3% wax loading. If the wax is used alone at this concentration (3%), a rating of only 50 is obtained.

Example 7

A composition of matter is prepared as in Example 5, except that a paraffin wax melting at 32.5° C. is used. This formulation leads to a spray test rating of 80 on application to spun rayon at 3% wax loading.

Example 8

A composition of matter is prepared as in Example 5, except that a paraffin wax melting at 51° C. is used. This formulation leads to a spray test rating of 80 on application to spun rayon at 3% wax loading.

Example 9

A mixed titanate ester of isopropanol and 2-ethyl-1,3-hexanediol was prepared by the procedure described in Example 1. The product was diluted with Stoddard solvent to give a 3% solution (based on total solids) and a square of nylon fabric was immersed, wrung out and dried. It showed a spray test rating of 80, whereas a similar piece of nylon treated with a 3% solution of wax and Stoddard solvent alone gave a rating of only 50–70.

Example 10

When the formulation of Example 9 was applied to wool crepe at wax loadings of 3 and 6%, spray ratings of 100 were obtained.

Example 11

When the formulation of Example 5 was applied to a fabric composed of a polymeric acrylic nitrile fiber at a wax loading of 2%, spray ratings of 80–90 were obtained.

Example 12

Solutions of titanate ester (prepared from 2 parts of tetrapropyl titanate and 3 parts of 2-ethyl-1,3-hexanediol) plus paraffin wax were made in benzene, chlorobenzene and in carbon tetrachloride. The ester:wax ratios were 1:30, and the wax concentration in the solvent was 4.5% in all cases. Samples of jean cloth and gabardine treated with these solutions at 3 to 4% wax loadings (based on fabric) gave spray test ratings of 100.

Example 13.—(Using a petrolatum wax)

Six grams of a white petrolatum wax (turbidity temperature 55° C.) were dissolved in 194 grams of Stoddard solvent to give a clear solution. 0.5 gram of the titanate ester obtained from 1 part of tetraisopropyl titanate and 1.5 parts of 2-ethyl-1,3-hexanediol (Example 1 above) was then added. A sample of cotton gabardine was immersed in this solution for a few minutes, passed through rollers to remove excess solvent, leaving about 3% wax on the fabric. After air drying of the fabric the spray test rating was found to be 70. When the process was duplicated except for omitting the titanate ester, the spray test rating was zero.

*Example 14.—(Using a ceresin wax)*

The procedure in Example 13 was repeated except that 6 grams of a petroleum ceresin wax (M. P. 55°–57° C.) was substituted for petrolatum wax, and cotton jean cloth was used as the test fabric. In this case also the fabric treated with the wax and solvent alone gave a spray test rating of zero, whereas the fabric treated according to this invention showed a rating of 70.

It will be understood that the proportions and details of procedure in the above examples may be varied within the skill of those engaged in this art, without departing from the spirit of this invention.

I am aware of the fact that certain titanium esters, more particularly, those having the octadecyl radical or other long chain alkyl groups, have to a limited extent the power to render fabric water-repellent by themselves. Such powers are very limited in that they require loading the fabric with a large quantity of the titanate (about 6% by weight of the fabric), they require curing the fabric (heating at about 105° to 150° C.), and often discolor the fabric to such an extent as to render such agents utterly inapplicable in practice. By contrast, in my invention, only a small quantity of titanate is put upon the fiber (less than 2% and more often in the range of 0.01 to 0.2%). No curing of the fabric is needed, and no discoloration is observed. Furthermore, my invention is not limited to titanates having long-chain alkyl radicals, but works equally well with short-chain titanium esters, which per se have no water-repellency powers.

It is clear that in my invention, I deal with an effect akin to catalysis or synergism, wherein one agent (the titanate) influences the normal activity of another agent (the water-repellency power of the wax), and increases the latter to an extent entirely unpredictable from the nature and properties of the first agent itself.

I claim as my invention:

1. A water-repellency composition adapted to be applied to textile fiber from a hydrocarbon solvent, said composition comprising as predominant water-repellency factor an anhydrous mixture of a hydrocarbon wax whose melting range is within the limits of 33° to 90° C. and an organic titanium compound of the general formula—

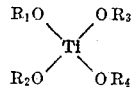

wherein some of the R's represent alkyl radicals of not over 6 C-atoms, while the remaining R's represent radicals of a 2-(lower alkyl)-1,3-alkane-diol whereof the alkane radical possesses from 4 to 24 C-atoms while the lower alkyl radical has no more than 4 C-atoms, the proportion of said titanium compound to said hydrocarbon wax being not less than 0.15% and not more than 25% by weight.

2. A water-repellency composition as defined in claim 1, said composition comprising further a non-polar organic liquid in proportion sufficient to give the entire composition a pasty to semifluid consistency.

3. A composition of matter as in claim 1, the titanium compound being the reaction product of tetraisopropyl titanate and 2-ethyl-1,3-hexanediol.

4. A composition of matter as in claim 1, the titanium compound being the reaction product of tetraisopropyl titanate and 2-methyl-1,3-pentanediol.

5. A composition of matter as in claim 1, the titanium compound being the reaction product of tetrabutyl titanate and 2-ethyl-1,3-hexanediol.

6. A water-repellency composition for textile fiber consisting essentially of an anhydrous mixture of a paraffin hydrocarbon melting within the limits of 33° to 90° C., a non-polar organic solvent, and an aliphatic tetraester of titanium, said tetraester of titanium being the reaction product of a lower tetraalkyl titanate with a 2-(lower alkyl)-1,3-alkanediol having from 5 to 6 C-atoms in the alkane radical and not over two C-atoms in the lower alkyl radical, said tetraester of titanium being present in said mixture to an extent of not less than 0.15% and not more than 25% by weight, based on the weight of said paraffin hydrocarbon.

7. A water-repellency composition as in claim 6, said tetraester of titanium being the reaction product of a lower tetraalkyl titanate and 2-ethyl-1,3-hexanediol.

8. A water-repellency composition as in claim 6, said tetraester of titanium being the reaction product of a lower tetraalkyl titanate and 2-methyl-1,3-pentanediol.

LARRY Q. GREEN.

REFERENCES CITED

The following references are of record in the file of this patent:

UNITED STATES PATENTS

| Number | Name | Date |
| --- | --- | --- |
| 278,443 | Maxfield | May 29, 1883 |

OTHER REFERENCES

Industrial and Engineering Chemistry, Oct. 1949, pp. 7A and 10A.

"Organic Compounds of Titanium," Industrial and Engineering Chemistry, vol. 42, issue 2, Feb. 2, 1950, pp. 251–253.